United States Patent [19]
Mistr, Jr.

[11] Patent Number: 6,153,943
[45] Date of Patent: Nov. 28, 2000

[54] POWER CONDITIONING APPARATUS WITH ENERGY CONVERSION AND STORAGE

[76] Inventor: Alfred F. Mistr, Jr., 908 Elaine Ave., Bon Air, Va. 23235

[21] Appl. No.: 09/261,341

[22] Filed: Mar. 3, 1999

[51] Int. Cl.$^7$ .................................................. F02C 6/00
[52] U.S. Cl. ................................................ 290/52; 60/39.02
[58] Field of Search ........................... 290/1 R, 1 A, 290/2, 52; 60/39.01, 39.02, 39.12, 652; 307/64, 68

[56] References Cited

U.S. PATENT DOCUMENTS

| | | | |
|---|---|---|---|
| 2,920,211 | 1/1960 | Gotoh | 290/30 |
| 3,678,284 | 7/1972 | Peters | 290/1 |
| 3,831,373 | 8/1974 | Flynt | 60/39.33 |
| 3,967,132 | 6/1976 | Takamine | 290/4 R |
| 4,077,748 | 3/1978 | Potz | 417/319 |
| 4,237,692 | 12/1980 | Ahrens et al. | 60/659 |
| 4,281,256 | 7/1981 | Ahrens et al. | 290/1 R |
| 4,439,720 | 3/1984 | Georges | 322/4 |
| 4,525,631 | 6/1985 | Allison | 290/4 R |
| 4,765,142 | 8/1988 | Nakhamkin | 60/652 |
| 4,827,152 | 5/1989 | Farkas | 307/68 |
| 4,872,307 | 10/1989 | Nakhamkin | 60/39.02 |
| 5,105,096 | 4/1992 | Waldschmidt et al. | 307/68 |
| 5,198,698 | 3/1993 | Paul et al. | 307/64 |
| 5,373,198 | 12/1994 | Jimenez | 307/68 |
| 5,646,458 | 7/1997 | Bowyer et al. | 307/67 |
| 5,831,341 | 11/1998 | Selfors et al. | 290/52 |
| 5,845,479 | 12/1998 | Nakhamkin et al. | 60/39.02 |

*Primary Examiner*—Nick Ponomarenko
*Attorney, Agent, or Firm*—McGuireWoods, LLP

[57] ABSTRACT

A method and apparatus for power conditioning and for storing electrical energy, fossil fuel energy, or both in the form of a compressed gas which may then be used in combination with a fossil fuel to generate conditioned electrical power is disclosed. The present invention provides a method wherein the energy so stored is used as a back-up power source to assure uninterrupted conditioned electrical power in the event of a failure of a primary electrical power source. Turbine rotors are maintained in rotation to provide a spinning reserve in that the inertia of the turbines can be used to generate power in the event of minor power disruptions, and the turbines can be powered for producing power in the event of greater power disruptions. The present invention provides an apparatus that enhances the flexibility and efficiency of a power consumer and the internconnected power providing system by allowing the user to have an efficient spinning reserve of power, by providing the capability of a user to shape the load, thereby reducing the spinning reserve requirement of the interconnected system, and to sell excess power and to control transportation costs. Since the present invention allows a user to purchase power from the most efficient source, the present invention promotes efficiency throughout the power generation and power transportation industry.

36 Claims, 2 Drawing Sheets

(AMENDED)

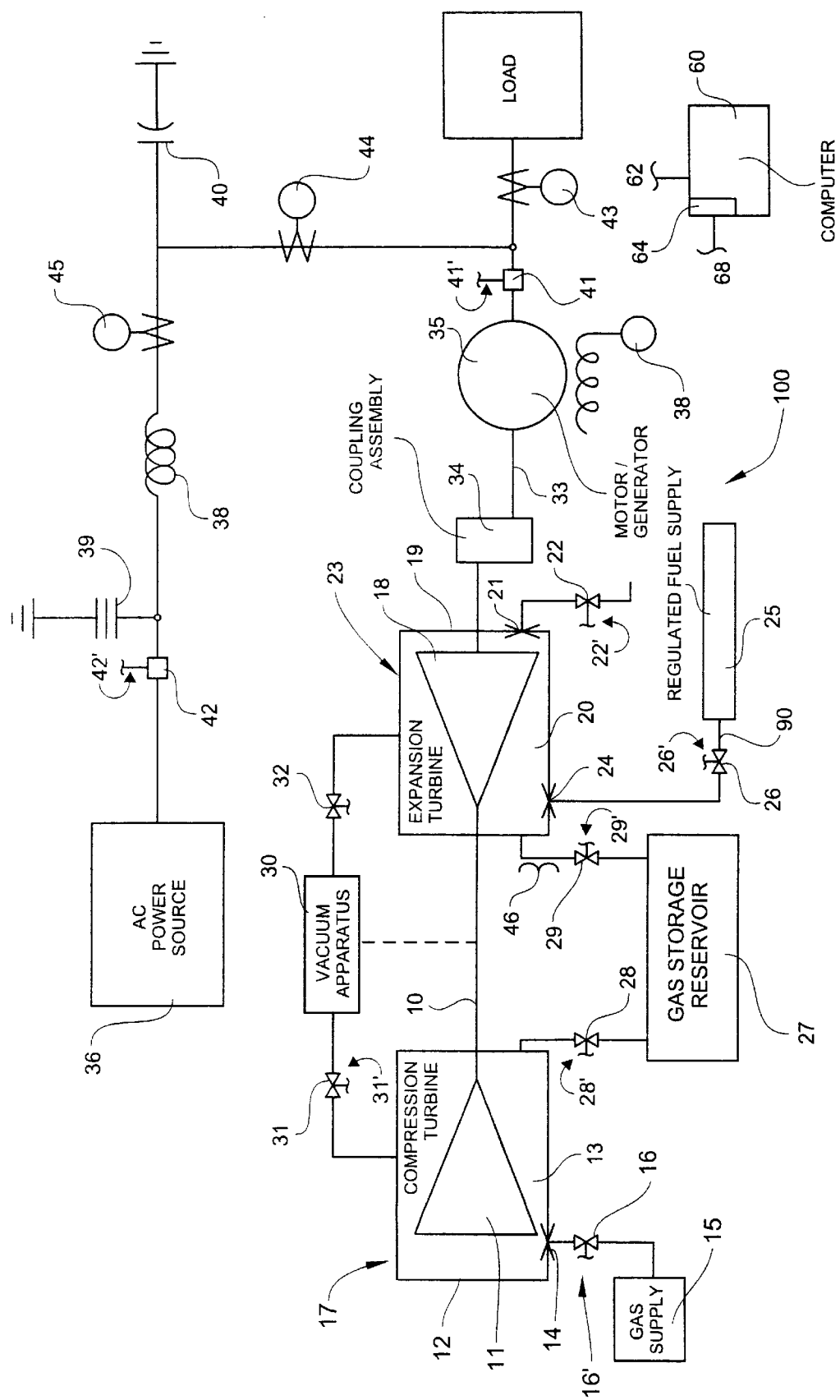
Fig. 1 (AMENDED)

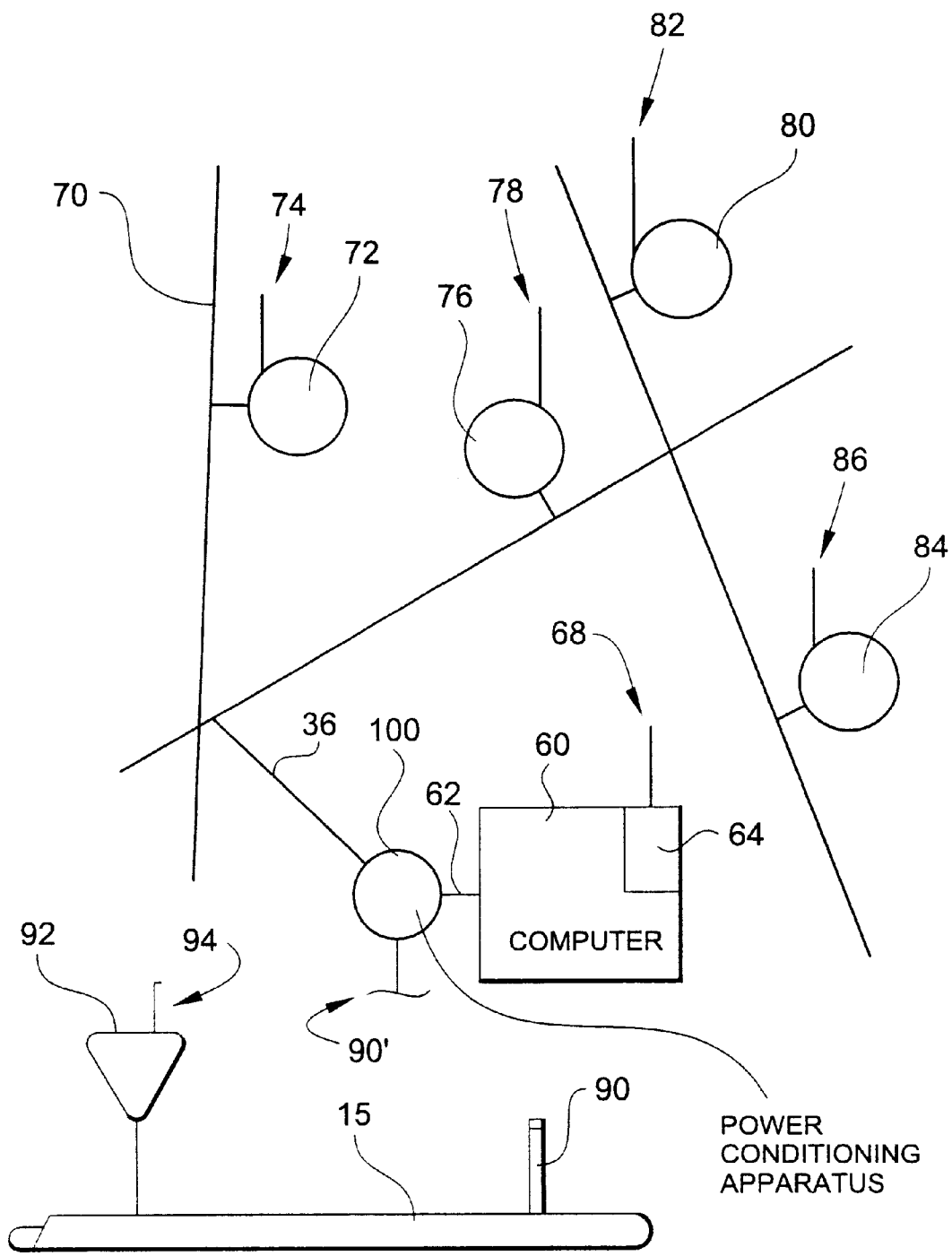
Fig. 2 (AMENDED)

POWER CONDITIONING APPARATUS WITH ENERGY CONVERSION AND STORAGE

BACKGROUND OF THE INVENTION

The present invention relates to a power conditioning apparatus capable of providing an uninterruptable supply of conditioned electrical power generated using a choice of energy sources. More particularly, the present invention is directed to a method of storing energy in the form of a compressed gas for later use in generating conditioned power, wherein the energy so stored may be selectively obtained from an electrical grid or from a fossil fuel depending on the relative market costs. The present invention is also capable of load shaping, or load following, in that it is capable of storing power when the load demand is below a predetermined value and supplementing grid power when the load demand is greater than the predetermined value, thereby providing an economic benefit to a user.

Deregulation of the electric and natural gas industries and consequent unbundling of power services will have the effect of creating an energy commodity. As with any commodity, transportation, or transmission, costs will be included in the final product cost. As a commodity, energy will be available in many forms from a variety of sources whose relative costs fluctuate with time. In this environment, the energy consumer would ideally choose his energy source based on the relative source costs. Energy consumers will also have the option of using interruptible power sources which will be priced lower than more reliable sources. The consumer will also be able to purchase power on an uninterruptable or "firm" basis, i.e., a guaranteed amount and availability of power, or on an interruptable or "non-firm" basis, i.e., power without a guarantee as to the amount or availability. As may be expected, non-firm power will be less expensive than firm power. Nevertheless, the increasing use of digital technology will present an ever-increasing need for uninterruptable conditioned electrical power.

Energy consumers thus will require flexibility to take advantage of the coming variety of energy options. One way of achieving flexibility is through tolling. Tolling is the ability to convert from one energy form to another, based on the prevailing spot price of the two energy sources. For example, if the unit spot price of a particular fuel is less than the unit price of electricity by an adequate amount, the owner of the fuel would be rewarded for converting his fuel to electricity for his own use, by selling it, or both. If, on the other hand, electricity prices are much lower than fuel costs, a fuel user would be better served by buying and using electricity.

Energy flexibility will also require the ability to take advantage of interruptible sources. While less expensive than more reliable sources, such sources present a danger to consumers who require uninterrupted, conditioned power. Thus, full advantage of interruptable power is only attainable by consumers with the ability to switch over to a reliable, efficient and economical back-up power source, preferably a self-generating one. Moreover, the switch to back-up power must be made without interruption of the supply to the critical consumer load.

Additionally, due to the expected increase in the number of energy producers, a consumer attempting to maintain the lowest possible energy costs will be required to monitor or somehow determine energy cost prevailing at a given time. This ability to realize the energy costs associated with a producer also should be combined with the ability to access energy from that producer and apply it to the consumer's load as dictated by cost.

It is thus apparent that in the evolving energy commodity market, consumers will need the ability to selectively use multiple energy sources, the ability to monitor and respond to changing energy production characteristics, the ability to convert and store energy for later use, and equipment for providing continuous, uninterrupted conditioned power.

SUMMARY OF THE INVENTION

It is accordingly an object of the present invention to provide an apparatus that allows an energy user to more efficiently address an unbundled and deregulated energy market.

It is another object of the present invention to allow a user to take advantage of open, private access to electrical transmission systems and to utilize computer communication techniques to provide a more self-sufficient energy user.

It is another object of the present invention to provide an apparatus that enhances the flexibility and efficiency of a power consumer and the interconnected power providing system by allowing the user to have an efficient spinning reserve of power, by providing the capability of a user to shape the load, thereby reducing the spinning reserve requirement of the interconnected system, and to sell excess power and to control transportation costs. Since the present invention allows a user to purchase power from the most efficient source, the present invention promotes efficiency throughout the power generation and power transportation industry.

It is another object of the present invention to provide a power conditioning apparatus that can maintain constant, conditioned power to a load in the event of short term or long term power disruptions.

It is another object of the invention to provide an apparatus for storing electrical energy, fossil fuel energy, or both in the form of a compressed gas which may then be used alone or in combination with fossil fuel energy to generate conditioned electrical power.

Another object of the present invention is to provide a method for converting and storing electrical energy, fossil fuel energy, or both for later use in the generation of conditioned electrical power. A further object is to provide a method wherein the energy so stored is usable as a back-up power source to provide uninterrupted conditioned electrical power in the event of a failure of not only the primary electrical power source, but also the transmission or distribution system required for power delivery.

It should be noted that the fossil fuel energy source may be in the form of natural gas. The references here to compressing and expanding gas are meant to refer to air or some other non-fuel gas and are not to imply compression, and storage and expansion of fossil fuel gas.

To those ends, a power conditioning apparatus with energy conversion and storage capabilities is provided for use to supplement power supplied to a load from a commercial power source, to operate using electrical power from an electrical power source, to operate using fossil fuel from a fuel power source, and to provide an auxiliary power source, power conditioning and load shaping. The power conditioning apparatus includes a rotary power shaft, a compression turbine connected to the rotary power shaft for being driven by the rotary power shaft, an expansion turbine connected to the rotary power shaft for driving the rotary power shaft, a motor/generator connected to the rotary power shaft for selectively driving and being driven by the rotary power shaft, and a gas storage reservoir selectively connectable to the compression turbine and the expansion turbine. The present invention also includes an assembly operatively connected to the compression turbine and the expansion turbine to reduce or minimize losses while maintaining the compression turbine and the expansion turbine rotation at a nominal operational speed, an electrical circuit for providing electrical communication between the motor/generator, the power source and the load, and an arrangement for controlling the operation of the apparatus. The control arrangement includes an assembly for monitoring electrical and mechanical conditions within the power conditioner, an assembly for monitoring the power supply and an assembly for controlling electrical and mechanical control devices associated with the power conditioning apparatus.

It is preferred that the assembly for controlling the operation of the system includes a preprogrammed computer, and the electrical control devices include a plurality of switches disposed within the electrical circuit in communication with the computer. Preferably, the mechanical control devices include a plurality of remotely actuable valves operatively connected to the compression turbine, the expansion turbine and the computer.

It is further preferred that the computer includes a modem for communication with remote sources of energy and that the computer is configured to determine the cost of energy available to the apparatus and to select one or more energy sources based on an internally calculated cost analysis. The computer is further preferably configured to monitor the presence and absence of power available from the power source and to activate the expansion turbine to drive the motor/generator responsive to the absence of power from the power source.

Preferably, the computer is configured to operate the apparatus for load shaping by monitoring the power source for a predetermined fixed power value and activating the expansion turbine to drive the motor/generator responsive to the computer determining that the power value is below the fixed power value and activating the compression turbine to charge the gas reservoir responsive to the computer determining that the power value is greater than the fixed power value.

The assembly for maintaining rotation of the compression turbine and the expansion turbine preferably includes a vacuum apparatus operatively connected to the computer, the compression turbine and the expansion turbine.

More specifically, the power conditioning apparatus with energy conversion and storage for converting and storing electrical energy, fossil fuel energy, or both in the form of a compressed gas, the gas being obtained from a gas supply and compressed using the apparatus for selective release in use in the production of electrical power includes a motor/generator having an electrical supply connection for selectively receiving supply power from an AC power source, and an electrical load connection for selectively providing conditioned AC power to a load. The present invention further includes a first rotary power shaft operatively attached to the motor/generator and an arrangement for power shaft coupling attached to the first rotary power shaft. A second rotary power shaft is included that is coupled to the first rotary power shaft using the arrangement for power shaft coupling. The present invention further includes a compression turbine including a compression turbine housing, or housings, defining a compression cavity and having a compression rotor disposed within the compression cavity, the compression rotor being operatively attached to the second rotary power shaft for rotation therewith. The compression turbine housing further defines an intake port in fluid communication with the compression cavity and selectively in fluid communication with a supply of gas. Further, an expansion turbine is included with the expansion turbine including an expansion turbine housing defining an expansion cavity and having an expansion rotor disposed within the expansion cavity, the expansion rotor being operatively attached to the second rotary power shaft for rotation therewith. The expansion turbine housing further defines a fuel supply port and an exhaust port in fluid communication with the expansion cavity, the fuel supply port being in fluid communication with a regulated fossil fuel supply. A vacuum apparatus is provided and is operatively connected to both the compression cavity and the expansion cavity for selective evacuation of the compression cavity and expansion cavity to selectively maintain rotation of the compression turbine, the expansion turbine or both. The present invention also includes a gas storage reservoir in fluid communication with the compression turbine for receipt and pressurized storage of gas compressed by the compression turbine with the reservoir being in fluid communication with the expansion turbine for selective flow of compressed gas from the gas storage reservoir into the expansion turbine to provide combustion air for the expansion turbine and to possibly drive the expansion turbine for short time periods and for storage. An arrangement is also provided for controlling gas flow between the compression turbine and the gas storage reservoir in addition to an arrangement for controlling gas flow between the gas storage reservoir and the expansion turbine. An arrangement is also provided for electrically isolating the AC power source from the electrical supply connection.

Preferably, the gas supply is an air supply and the gas storage reservoir is an air storage reservoir. The present invention further preferably includes a control system for monitoring the electrical and mechanical operating conditions of the apparatus and to selectively automatically control overall system operations. The control system further preferably includes a preprogrammed computer and the arrangement for controlling gas flow between the compression turbine and the gas storage reservoir and the arrangement for controlling gas flow between the gas storage reservoir and the expansion turbine include remotely actuable valves selectively operable by the computer. The present invention further preferably includes a plurality of electrical switches for controlling electricity flow within the power conditioning apparatus, the switches being remotely selectively actuable responsive to the computer. These switches may be formed as relays, solenoid controlled switches, solid state devices or any other form of electrical circuit connection device that may be used to open or close the electrical circuit. The term switches, as used herein, should be considered to encompass all such electrical devices.

The present invention further preferably includes an arrangement associated with the computer for communication between the computer and any entity remotely disposed from the energy conversion and storage apparatus. Preferably, the remotely disposed entity can include a commercial electric power source, a commercial fossil fuel power source, and energy transportation provider, or any or all of the above. The references to fossil fuel herein should be preferably considered as natural gas sources. Nevertheless, it should be understood that any other fuel that will fulfill the requirements of the apparatus may be used.

Preferably, the present invention further includes an arrangement for voltage spike protection electrically operable between the AC power source and electrical supply connection. The voltage spike protection arrangement preferably includes a predetermined arrangement of inductors and metal oxide varistors. Further, the present invention preferably includes an arrangement for harmonic filtering connected to the electrical load connection of the motor/generator. The harmonic filtering arrangement preferably comprises a grounded wye capacitor bank. The present invention further preferably includes an arrangement for recovering heat connected to the compression turbine housing and the expansion turbine housing. It is further preferred that the present invention include at least one heat exchanger arranged as necessary to improve efficiency. For example, a heat exchanger may be connected to transfer exhaust heat to the arrangement for controlling gas flow between the gas storage reservoir (high pressure) and the expansion turbine (low pressure) to prevent component icing. Additionally, exhaust and compression heat may be used for process heat as may prove efficient. Further, expansion or throttling heat transfer may be used for process cooling. An arrangement is preferably associated with the vacuum apparatus for operatively connecting the vacuum apparatus to the second rotary power shaft, thereby powering the vacuum apparatus. An arrangement is also preferably included for detecting interruption and restoration of electrical power from the AC power source.

The present invention is further directed to a method for storing electrical energy in the form of a compressed gas for selective release and use in the production of electrical power. The method includes the steps of providing a rotary power shaft; providing an expansion turbine including an expansion turbine housing defining an expansion cavity, an exhaust port in fluid communication with the expansion cavity, and a fuel supply port selectively in fluid communication with a regulated power supply, the expansion turbine also including an expansion turbine rotor disposed within the expansion cavity, the expansion turbine rotor being operatively attached to the rotary power shaft. Further, the steps include providing a compression turbine including a compression turbine housing defining a compression cavity and an intake port in fluid communication with the compression cavity selectively in fluid communication with the gas supply, the compression turbine also including a compression turbine rotor disposed within the compression cavity, the compression turbine rotor being operatively attached to the rotary power shaft; providing a gas storage reservoir selectively in fluid communication with the compression cavity and the expansion cavity; providing a preferably synchronous motor/generator operatively connected to the rotary power shaft and selectively connectable to an AC power source and to an electrical load; and providing a vacuum apparatus operatively connected to the expansion cavity and to the compression cavity for selective evacuation of the expansion cavity and the compression cavity.

The method further includes the steps of connecting the motor/generator to the AC power source, thereby powering the motor/generator, thereby rotating the power shaft, thereby rotating the expansion turbine rotor and the compression turbine rotor; evacuating the expansion cavity using the vacuum apparatus to maintain rotation of the expansion turbine to provide enhanced responsiveness to a change in operating mode. Further, the rotation of the turbine rotors provides enough inertia so that the apparatus can deliver power to the load in the event of short term power interruptions of several cycles. The method further includes steps of pressurizing the gas storage reservoir by compressing gas from the gas supply using the compression turbine and directing the compressed gas from the compression turbine into the gas storage reservoir; terminating pressurization of the gas storage reservoir by obstructing the flow of gas from the gas supply to the compression turbine and obstructing the flow of compressed gas from the compression turbine into the gas storage reservoir; evacuating the compression cavity using the vacuum apparatus to maintain rotation of the compression rotor; isolating the motor/generator from the AC power source and substantially simultaneously initiating electrical power generation by directing compressed gas to flow from the gas storage reservoir into the expansion turbine and directing fuel to flow from the regulated fuel supply into the expansion turbine and igniting the fuel along with compressed gas thereby powering the expansion turbine, thereby maintaining rotation of the rotary power shaft thereby powering the motor generator, thereby supplying electricity to the electrical load; and terminating electrical power generation by obstructing the flow of compressed gas from the storage reservoir into the expansion turbine, obstructing fuel flow from the regulated fuel supply into the expansion turbine and substantially simultaneously restoring connection of the motor/generator to the AC power source.

The method preferably is used to provide uninterruptable AC power and further includes the steps of detecting interruption of power from the AC power source after pressurization of the gas storage reservoir and evacuation of the compression cavity, the interruption immediately being followed by the step wherein the motor/generator is isolated from the AC power source and electrical power generation is initiated; and detecting restoration of power from the AC power source, the restoration being immediately followed by the step wherein the electrical power generation is terminated.

The method preferably further includes the steps of, during electrical power generation, further pressurizing the gas storage reservoir by compressing gas from the gas supply using the compression turbine and directing the compressed gas into the gas storage reservoir and following termination of electrical power generation, evacuating the compression cavity using the vacuum apparatus to maintain rotation of the compression rotor.

Due to the presence of the computer controls within the system, it is highly advantageous to maintain rotation of the compression rotor and the expansion rotors so that when the computer switches operational modes, the apparatus can respond substantially instantaneously due to the rotors, especially the expansion turbine rotor, being at operational speed.

The method preferably further includes the step of providing a control system for monitoring operating conditions of the apparatus and to selectively automatically control system operations, the control system including a preprogrammed computer, a plurality of remotely actuable computer controlled valves and a plurality of remotely actuable computer controlled switches, the valves being disposed within the system to obstruct gas, fuel and exhaust flow, and the switches being disposed within the system to control and direct current. The method preferably further includes the steps of providing a communication system associated with the computer for communication between the computer and remote sources of energy, and establishing communication with the remote sources of energy, monitoring energy rates using the computer, determining the most economical and efficient configuration for the apparatus using the computer and the energy rates obtained thereby, and configuring the apparatus to operate in a mode that will provide the most economical and efficient energy usage as determined by the computer.

Further, the method includes the steps of maintaining rotation of the expansion turbine at an operational speed and bringing the expansion turbine online using the computer controlled valves when the computer determines that it is cost effective to bring the expansion turbine online. In addition, the method may include the step of maintaining rotation of the expansion turbine at an operational speed and bringing the compression turbine online using the computer controlled valves when the computer determines that it is cost effective to bring the compression turbine online. In addition, the rotating turbine rotors can be immediately brought online to provide power in the event of short term power disruptions.

According to another embodiment of the method of the present invention, the method for storing electrical and fossil fuel energy in the form of compressed air for selective release and use in the production of electric power includes the steps of providing a rotary power shaft; providing an expansion turbine including an expansion turbine housing defining an expansion cavity, an exhaust port in fluid communication with the expansion cavity and a fuel supply port selectively in fluid communication with a regulated fuel supply, the expansion turbine also including an expansion turbine rotor disposed within the expansion cavity, the expansion turbine rotor being operatively attached to the rotary power shaft and providing a compression turbine including a compression turbine housing defining a compression cavity and an intake port in fluid communication with the compression cavity and selectively in fluid communication with an air supply, the compression turbine also including a compression turbine rotor disposed within the compression cavity, the compression turbine rotor being operatively attached to the rotary power shaft. The method further includes the steps of providing an air storage reservoir in fluid communication with the compression cavity and the expansion cavity; providing a motor/generator operatively connected to the rotary power shaft and selectively connectable to an AC power source into an electrical load; providing a vacuum apparatus operatively connected to the expansion cavity and to the compression cavity for selective evacuation of the expansion cavity and the compression cavity to maintain rotation of the compression rotor and the expansion rotor; connecting the motor/generator to the AC power source, thereby powering the motor/generator thereby rotating the rotary power shaft, thereby rotating the expansion turbine rotor and the compression turbine rotor; and evacuating the expansion cavity using the vacuum apparatus to maintain rotation of the expansion turbine rotor; pressurizing the air storage reservoir by compressing air from the air supply using the compression turbine and directing the compressed air into the storage reservoir until pressure in the air storage reservoir reaches operating pressure of the expansion turbine; isolating the motor/generator from the AC power source and substantially simultaneously initiating further pressurization of the air storage reservoir and initiating the generation of electrical power by directing compressed air to flow from the air storage reservoir into the expansion turbine and substantially simultaneously directing the fuel to flow from the regulated fuel supply into the expansion turbine and igniting the fuel along with the compressed air, thereby powering the expansion turbine, thereby maintaining rotation of the rotary power shaft, thereby powering the compression turbine, thereby compressing air from the air supply and directing the compressed air into the air storage reservoir, the rotation of the rotary power shaft further powering the motor/generator, thereby supplying electricity to the electrical load; terminating air storage reservoir pressurization and electrical power generation by obstructing the flow of compressed air from the air storage reservoir into the expansion turbine and obstructing flow of fuel from the regulated power supply into the expansion turbine; reconnecting the motor/generator to the AC power source, thereby powering the motor/generator, thereby maintaining rotation of the rotary power shaft; evacuating the compressor cavity and expansion cavity using the vacuum apparatus to maintain rotation of the expansion turbine rotor and the compression turbine rotor; isolating the motor/generator from the AC power source and substantially simultaneously initiating electrical power generation by directing compressed air and fossil fuel to flow into the expansion turbine, igniting the compressed air and fossil fuel, thereby powering the expansion turbine, thereby maintaining rotation of the power shaft, thereby powering the motor/generator, thereby supplying electricity to the electrical load and terminating electrical power generation by obstructing the flow of compressed air and fossil fuel into the expansion turbine and substantially simultaneously restoring connection of the motor/generator to the AC power source.

This method further preferably includes the steps of providing a control system and communications system as discussed above. The method also preferably further includes the steps utilized to provide continuous AC power which include detecting interruption of power from the AC power source using the control system after pressurization of the gas storage reservoir and evacuation of the compression cavity, the interruption being immediately followed by the step wherein the motor/generator is isolated from the AC power source and electrical power generation is initiated and detecting restoration of power from the AC power source using the control system with the restoration immediately being followed by the step wherein electrical power generation is terminated.

According to another method of the present invention, a method for load shaping using a power conditioning apparatus with energy conversion and storage capabilities includes the steps of providing a rotary power shaft; a compression turbine connected to said rotary power shaft for being driven by said rotary power shaft; an expansion turbine connected to said rotary power shaft for driving said rotary power shaft; a motor/generator connected to said rotary power shaft for selectively driving and being driven by said rotary power shaft; a gas storage reservoir selectively connectable to said compression turbine and said expansion turbine; an arrangement operatively connected to said compression turbine and said expansion turbine to maintain said compression turbine and said expansion turbine in rotation at a nominal operational speed; an electrical circuit for providing electrical communication between said motor/generator, the power source and the load; and an assembly for controlling the operation of said apparatus including an assembly for monitoring electrical and mechanical conditions within said power conditioner; an assembly for monitoring the power source and an assembly for controlling electrical and mechanical control devices associated with said power conditioning apparatus. The method for load shaping also includes monitoring the power available from said power source based on a predetermined threshold power value using the assembly for monitoring the power source; activating said expansion turbine in a configuration to provide supplemental power to the load, based on a determination by the assembly for monitoring said power source that the power available from said power source is less than said threshold value; and activating the compression turbine in a configuration to charge said gas reservoir, based on a determination by said assembly for monitoring said power source that the power available from said power source is greater than said threshold value.

According to another method of the present invention, a method for power conditioning using a power conditioning apparatus with energy conversion and storage capabilities, includes the steps of providing a rotary power shaft; a compression turbine connected to said rotary power shaft for being driven by said rotary power shaft; an expansion turbine connected to said rotary power shaft for driving said rotary power shaft; a motor/generator connected to said rotary power shaft for selectively driving and being driven by said rotary power shaft; a gas storage reservoir selectively connectable to said compression turbine and said expansion turbine; an assembly operatively connected to said compression turbine and said expansion turbine to maintain said compression turbine and said expansion turbine rotation at a nominal operational speed; an electrical circuit for providing electrical communication between said motor/generator, the power source and the load; and an assembly for controlling the operation of said apparatus including an assembly for monitoring electrical and mechanical conditions within said power conditioner; an assembly for monitoring the power source and an assembly for controlling electrical and mechanical control devices associated with said power conditioning apparatus. The method further includes the steps of maintaining said compression turbine and said expansion turbine in rotation at a nominal operational speed using said an assembly operatively connected to said compression turbine and said expansion turbine to maintain said compression turbine and said expansion turbine rotation at a nominal operational speed; monitoring the power available from said power source using said an assembly for monitoring the power source; and providing power to the load using said expansion turbine in the event that said an assembly for monitoring the power source determines that power is not present from said power source.

By the above, the present invention provides an apparatus that can provide efficient energy use, provide conditioned power, provide load shaping and can provide supplemental electric power in case of a failure or disruption od electrical power from a commercial source. The control system of the present invention can monitor energy rates and operate the apparatus in a cost effective manner. Further, use of the present invention can effect market energy efficiency and costs by consistently obtaining power and energy transportation from the most cost effective, and most efficient, producer or transporter. Therefore, the present invention can provide market incentives for efficiency and can provide the user control over incremental energy costs.

BRIEF DESCRIPTION OF THE DRAWINGS

FIG. 1 is a schematic representation of an energy storage apparatus according to the preferred embodiment of the present invention; and FIG. 2 is a diagrammatic representation of the present invention illustrated in FIG. 1 illustrating the interaction of the present invention with outside energy sources.

DESCRIPTION OF THE PREFERRED EMBODIMENTS

The present invention provides a power conditioning apparatus including energy conversion and storage that will allow the user to control and select energy sources based on economics, load conditions or other factors. The present invention also allows load shaping or load following, as will be explained in greater detail hereinafter. The users may be residential users, including community associations, commercial or industrial power consumers, or commercial power brokers. The device may be increased in size and capacity dependent on the requirements of the user. Using a computer-based control system, the apparatus can provide the user with the ability to automatically monitor prevailing energy conditions and adjust the operation of the apparatus in accordance with those conditions according to preprogrammed responses. The power conditioning apparatus with energy conversion and storage according to the present invention is intended to operate using at least three basic operational modes including a pressurization, or charging, mode; a power conditioning, or standby, mode; and an electrical power generation mode. The apparatus in the power conditioning mode can provide power to the load, even in the event of short term power disruptions. Load shaping may be accomplished with a combination of the generating and storage functions.

In the pressurization mode, energy from an electrical power source is used to power a motor/generator connected to a conventional compression turbine which pressurizes (charges) a gas storage reservoir. Alternatively, if the gas being used is air, pressurization may be accomplished by initially using energy from an electrical power source, then, upon reaching a certain pressure level, by combusting fuel and compressed air in a conventional expansion turbine thereby powering the compression turbine. In the power conditioning, or standby, mode, the turbines are inoperative while the motor/generator powers the continuous rotation of the turbine rotors. When in this mode, both the compression turbine and expansion turbine cavities are evacuated to maintain rotation of the compression rotor and the expansion rotor for enhanced responsiveness of the system. The inertia of the rotating turbine rotors can provide interim power in the event of short duration power disruptions from the external system. Therefore, the present invention can provide constant power even if the interruption is on the order of several cycles. In the electrical generation mode, gas from the gas storage reservoir, which is preferably air, is directed into the expansion turbine where it is combined with fuel and ignited, the resulting combustion powering the expansion turbine and the motor/generator to provide generated electricity for a load. Preferably, the power supplied to the output load is conditioned at all times. It should be noted that the compressed gas used by the present invention is preferably atmospheric air. The referenced "fuel" may be natural gas or another fossil fuel. The present invention does not compress and store fuel gas, such as natural gas.

Although the present invention is illustrated schematically, it will be apparent to those skilled in the art that the various structural and operational elements are readily available commercially. Further, these elements may be frame-mounted, contained within a single housing or mounted in various locations while maintaining their operative engagement.

Turning now to the drawings and, more particularly to FIG. 1, a first preferred embodiment of the energy storage apparatus of the present invention is illustrated generally at 100 and includes a rotary power shaft 10 having a compression turbine rotor 11 and an expansion turbine rotor 18 operatively attached thereto. The compression turbine rotor 11 is disposed within a compression turbine housing 12 which defines a compression cavity 13. The compression turbine housing 12 includes a gas intake port 14 to which a gas supply 15 is selectively connected through a gas intake valve 16. Taken together, the compression turbine rotor 11, compression turbine housing 12, compression cavity 13 and gas intake port 14 define a compression turbine 17. The expansion turbine rotor 18 is disposed within an expansion turbine housing 19 which defines an expansion cavity 20. The compression turbine housing 19 includes an exhaust port 21 which is selectively connected to the ambient environment through an exhaust valve 22. Taken together, the expansion turbine rotor 18, expansion turbine housing 19, expansion cavity 20 and exhaust port 21 define an expansion turbine 23. The exhaust valve 22 is open when the expansion turbine 23 is operating and closed when the expansion turbine 23 is not operating. The expansion turbine housing 19 of the power conditioning apparatus 100 includes a fuel supply port 24 which is selectively connected to a regulated fuel supply 25 through a fuel supply valve 26. The fuel used may be natural gas, oil or any other suitable fossil fuel. When the expansion turbine 23 of the energy storage apparatus 100 is not operating, the exhaust valve 22, storage outlet control valve 29 and fuel supply valve 26 are all closed and the expansion vacuum control valve 32 is opened to permit evacuation of the expansion cavity 20.

The present invention further includes a gas storage reservoir 27 that is preferably in the form of a compressed air tank and is selectively connected to the compression turbine 17 so that gas may flow from the compression turbine 17 through a storage control valve 28 into the gas storage reservoir 27. Preferably, the tank is formed as a serpentine pipe for space control and 3200 feet of 24"I.D. pipe will store sufficient air for system operations. Whenever the compression turbine 17 is not operating, the storage control valve 28 is closed to prevent back flow and assure isolation of the compression cavity 13. The gas storage reservoir 27 is also selectively connected to the expansion turbine 23 so that compressed gas may flow from the gas storage reservoir 27 through a storage outlet control valve 29 into the expansion turbine 23. When the expansion turbine 23 is not operating, the storage outlet control valve 29 is closed to assure isolation of the expansion turbine cavity 20. For the purpose of preventing icing of components, a heat exchanger 46 is disposed on the expansion turbine side of the storage outlet control valve 29.

By connecting the expansion and compression rotors to a single shaft and maintaining constant connection to the motor/generator, the present invention avoids the complication and transition delay resulting from the use of clutches to separate the components. Rotation of the two turbines is maintained during all modes of operation, thus eliminating the delay associated with spin-up when changing from one mode of operation to another. This feature enhances the ability of the present invention to respond to the computer control system as will be explained in greater detail hereinafter. The invention provides for the selective evacuation of the two turbine cavities when either or both of the turbines are not in operation. Evacuation minimizes the drag force (windage) on the continuously rotating turbine rotors and thus minimizes the power required to maintain rotation of the shaft to which they are attached. Keeping the turbines at speed also minimizes any time lag, and accompanying voltage drop as seen by the load.

To accomplish cavity evacuation, the present invention includes a vacuum apparatus 30 which may be externally driven or may optionally be operatively connected to and driven by the rotary power shaft 10. The optional mechanical shaft connection is illustrated in broken lines in FIG. 1. The vacuum apparatus 30 is selectively connected to the compression turbine 17 through a compression vacuum control valve 31. When the compression turbine 17 is not operating, the gas intake valve 16 and the storage control valve 26 are closed and the compression vacuum control valve 31 is opened to permit the evacuation of the compression cavity 13. The vacuum apparatus 30 is also selectively connected to the expansion turbine 23 through an expansion vacuum control valve 32. When the expansion turbine 23 is not operating, the exhaust valve 22 and the storage outlet control valve 29 are closed and the expansion vacuum control valve 32 is opened to permit the evacuation of the expansion cavity 20.

The rotary power shaft 10 is coupled to a motor/generator rotary power shaft 33 using a coupling assembly 34. A gearbox is a suitable coupling assembly. Those skilled in the art will appreciate that other known methods of shaft coupling may be used. The motor/generator rotary power shaft 33 is operatively attached to a motor/generator 35 which is electrically connected to an AC power source 36 and an electrical load 37. The motor/generator 35 incorporates a field regulator 38 which controls load voltage and reactive power. This function effectively controls the load power factor as seen from the external supply system. By properly switching out inductors, the apparatus may be used to sell reactive power and voltage support to the transmission or distribution system. A secondary switch 41 is incorporated to provide the capability of isolating the motor/generator 35 from the AC power source 36 and the electrical load 37. A primary switch 42 is incorporated to provide the capability of isolating the AC power source 36 from the motor/generator 35 and the electrical load 37.

The power conditioning apparatus of the present invention may be operated manually or automatically using a computer to monitor system status and control valve and circuit breaker operation. The apparatus may also be operated semi-automatically using a visually monitored mimic board or similar method. The present invention is readily adaptable to several control systems and methods and should not be limited in any way by the chosen control system.

The preferred embodiments of the present invention include voltage spike protection between the AC power source 36 and the motor/generator 35 and electrical load 37. Preferably, this protection is in the form of a predetermined arrangement of series inductors 38 and metal oxide varistors 39. If additional power conditioning is required, the present invention may optionally include harmonic filtering components. The preferred embodiment of an energy conversion storage apparatus with harmonic filtering incorporates a grounded wye capacitor bank 40, although other state of the art components may be used.

The power conditioning apparatus of the present invention includes three electrical meters 43, 44 and 45 which detect and measure the flow of electricity at key locations. A first electrical meter 43 is disposed in circuity associated with the load. The second electrical meter 44 is disposed in the circuit intermediate the AC Power source 36 and the motor generator 35. The third meter 45 is disposed in the AC power source circuit. In particular, these meters permit the detection of fluctuations and/or interruptions in power from the AC power source 36 which can then be used as the basis for changing from power conditioning mode to generation mode in order to prevent the interruption of power to the electrical load 37. The meters further provide input as needed for load following or load shaping.

The present invention also includes a computer control system illustrated generally at 60 in FIG. 1. The computer 60 is preprogrammed to operate the system and achieves the various operative system configurations through the use of remotely actuated valves and switches. These include actuators 41', 42' for the switches or breakers 41, 42 and actuators 16', 22', 26', 28', 29', 31', 32' associated with valves 16, 22, 26, 28, 29, 31, 32 respectively. The computer is programmed to monitor the condition of these valves and interpret these conditions as the operational mode of the system. Additionally, the computer receives signals from the various meters and other output devices within the system to fully control system operation through wiring 62. The computer 60 is shown displaced from the remainder of the apparatus 100 but it will be understood by those skilled in the art that due to the wiring 62, the computer may be placed in any convenient location and, ultimately, can be integrated into a full house management or other business management computer. The computer also includes a modem 64 or other telecommunication device operative over phone lines illustrated at 68 or in a broadcast mode or any other communication mode. With reference to FIG. 2, this communications mode allows the computer 60 to monitor energy rates and control the system 100 based on the rates. As seen in FIG. 2, an electrical power grid, illustrated diagrammatically at 70, includes several representative power generation units 72, 76, 82 and 86 which include communication systems 74, 78, 82 and 86, respectively, which communicate with the control computer 60 to provide rate information. Additionally, a natural gas supplier 92 supplying gas to a pipeline 15 may also include a communication device 94 for communication with the computer to supply gas through gas lines 90, 90' in order to allow the control computer 60 to monitor gas rates in the same manner as electricity rates are monitored. By maintaining real time values of energy costs, the computer can calculate the optimum system operational mode for the energy generation and storage apparatus of the present invention and control operation thereof in order to minimize energy costs to the user. For example, should the computer indicate that a first energy supplier 72 is offering power at rates that are less than a second energy supplier 84, the system can acquire power from that supplier without the energy storage apparatus being online. Should the cost become sufficiently less economical, the present invention can bring the system online to provide supplementary or substitute electric power. Further, the computer can determine the lowest rates at any given time to obtain power at these low rates to provide a charge to the air system of the present invention thereby storing this energy at a lower cost than would be realized had the energy been consumed at the higher rates.

As stated before, the present invention may be sized to accommodate various users. The example below provides calculations regarding the air requirement for twelve hours of operation with a one megawatt output.

EXAMPLE 1

Assumptions

Natural gas energy capacity, approximately: 1000 btu/ft$^3$
Specific gravity of natural gas approximately: 0.6
Specific gravity of air: 1.0
Combination process uses approximately 10 units of air per 1 unit of gas running normally at 150% lean for safety. Lack of precision control in a conventional system requires an additional safety margin.
Heat rate for gas turbine: 10,000 btu/kwh
Compressor: 5000 btu/kwh
Output to generator: 5,000 btu/kwh
Total: 10,000 btu/kwh
Turbine inlet pressure=600 psi
gas/kwh=5000 btu/1000 btu/ft$^3$=5 ft$^3$/kwh @ 1 atm
air/kwh 0.6×5 ft$^3$/kwh×10×1.5×1=45 ft$^3$/kwh @ 1 atm
air/gas ratio=45/5=9
If air is stored at 1800 psi the ratio becomes 3
Air use in 1 MW machine

1MWH =

$$\frac{5000 \text{ btu/kwh} \times 1000 \text{ kw/mw}}{1000 \text{ btu/ft}^3} = 5000 \text{ ft}^3 / \text{mwh @ ambient pressure}$$

$$\frac{5000 \text{ ft}^3 / \text{mwh}}{600 \text{ psi}} \times 14.7 \text{ psi} = 122.45 \text{ ft}^3 / \text{hr}$$

Air @ 1800 psi 122.45 ft$^3$×3=367.35 ft$^3$/hr for 12 hours of operation, the air requirement becomes
367.35 ft$^3$/hr×12 hr=4408.2 ft$^3$ increase to 5000 ft$^3$ for leak allowance
presume a 24"I.D. pipe, the pipe volume should be 5000 ft$^3$
Vol=A×L where A=area=$\pi r^2$
L=pipe length $$\frac{5000 \text{ ft}^3}{\pi (1)^2 \text{ ft}^2} = \sim 1600 \text{ ft}$$

Since the pressure decays with use, assume a safety factor of 2 and therefore the pipe should be approximately 3200 feet long.

A serpentine configuration can economize the space necessary to lay the pipe.

As can be seen from the above example, a one megawatt machine will require approximately 5,000 cubic feet of air to interact with natural gas to provide a twelve hour operating cycle.

A typical operative cycle of the power conditioning apparatus 100 can extend from initiation of the pressurization mode, through power conditioning mode into power generation mode and back to power conditioning mode. Further, the present power conditioning apparatus can operate in a load shaping, or load following mode, a variation on the power conditioning mode. The present apparatus 100 provides a high degree of flexibility as to methods of use depending on the relative costs of electricity and other fuels. It is contemplated that the present invention may be used by at least three distinct categories of users. First, homeowners may use a version of the present invention for residential energy management. Second commercial and industrial users may use the present invention to power businesses. This catagory may include aggregators, including community associations and shopping centers. Finally, power brokers may use the present invention to produce commercially available energy. The components, and, consequently, the output of the present invention can be sized accordingly.

Basic methods of equipment operation are discussed below with reference to FIG. 1. These include charging the system using electricity as a primary power source, charging the system using fuel as a primary power source, both followed by power generation using a combination of stored air and fuel. All methods are computer controlled. A basic operational evolution using the device will proceed from charging the air supply, through steady state operation in the power conditioning mode, through power generation and load shaping modes. The following methods explain the equipment operation and operational configurations necessary to perform the basic functions as required by the various operational modes.

A first method provides charging of the air supply by conversion of electrical energy to compressed air energy for later generation powered by the combustion of fuel and compressed air. The method is accomplished using the power conditioning apparatus 100 with an air supply as the gas supply 15. The air supply may be the ambient atmosphere. The motor/generator 35 is then connected to the AC power source 36 by closing the secondary switch 41. This powers the motor/generator 35, thereby powering the two rotary power shafts 33 and 10 and rotating the expansion turbine rotor 18 and the compression turbine rotor 11. Isolate and evacuate the expansion cavity 13 by closing the exhaust valve 21 and the fuel supply valve 24 and opening the expansion vacuum control valve 32. The gas storage reservoir 27 may then be pressurized by opening the gas intake valve 16 and the storage control valve 26, compressing air from the gas supply 15 using the compression turbine 17, and directing the compressed air into the gas storage reservoir 27. Pressurization may be terminated by closing the gas intake valve 16 and the storage control valve 26.

The power conditioning mode may then be initiated by opening the compression vacuum control valve 31 and evacuating the compression cavity 13. The electrical power generation mode may be initiated by firing the expansion turbine and managing output through fuel and air control. In the event of a supply system disturbance, the apparatus may be isolated by opening the primary switch 42 to isolate the motor/generator 35 and the electrical load 37 from the AC power source 36. Substantially simultaneously, initiate electrical power generation by opening the storage outlet control valve 29, the exhaust valve 22 and the fuel supply valve 26, thus directing compressed air and fuel to flow into the expansion turbine 23. The resulting fuel-air mixture is then ignited thereby powering the expansion turbine 23, maintaining rotation of the two rotary power shafts 10 and 33, thereby powering the motor/generator 35, and supplying electricity to the electrical load 37. Electrical power generation may be terminated by closing the storage outlet control valve 29, the exhaust valve 21 and the fuel supply valve 26. Substantially simultaneously, close the primary switch 42 to restore connection of the motor/generator 35 and the electrical load 37 to the AC power source 36.

A return to the power conditioning mode may be accomplished by opening the expansion vacuum control valve 32 and evacuating the expansion cavity 13.

A second method provides air supply charging by conversion of fuel energy to compressed air energy for later power generation. This method is accomplished by the power conditioning apparatus 100 with an air supply as the gas supply 15. The motor/generator 35 is disconnected from the AC power source 36 by opening the secondary switch 41. Isolate and evacuate the expansion cavity 13 by closing the exhaust valve 21 and the fuel supply valve 24 and opening the expansion vacuum control valve 32. Pressurization of the gas storage reservoir 27 may then be initiated by opening the gas intake valve 16 and the storage control valve 26, compressing air from the gas supply 15 using the compression turbine 17, and directing the compressed air into the gas storage reservoir 27. Open the exhaust valve 22 and the fuel supply valve 26, thus directing fuel to flow into the expansion turbine 23. Ignite the fuel, thereby powering the expansion turbine 23, thereby maintaining rotation of the two rotary power shafts 10 and 33. This powers the compression turbine 17 thereby pressurizing the gas storage reservoir 27. Pressurization may then be terminated by closing the gas intake valve 16, the storage control valve 26, the storage outlet control valve 29, the exhaust valve 21 and the fuel supply valve 26.

The power conditioning mode may be initiated by opening the compression vacuum control valve 31 and the expansion vacuum control valve 32 and evacuating the compression cavity 13 and the expansion cavity 20. The power generation mode may be initiated by opening the primary switch 42 to isolate the motor/generator 35 and the electrical load 37 from the AC power source 36. Substantially simultaneously, open the storage outlet control valve 29 and the exhaust valve 22, thus directing compressed air to flow into the expansion turbine 23. This powers the expansion turbine 23 which maintains rotation of the two rotary power shafts 10 and 33, powering the motor/generator 35, and supplying electricity to the electrical load 37. Electrical power generation may be terminated by closing the storage outlet control valve 29 and the exhaust valve 21. Substantially simultaneously, close the primary switch 42 to restore connection of the motor/generator 35 and the electrical load 37 to the AC power source 36. A return to power conditioning mode may then be accomplished by opening the expansion vacuum control valve 32 and evacuating the expansion cavity 13.

An additional variation of the operational methods would include the incorporation of a step to operate the compression turbine 17 during the electrical generation mode to replenish the compressed air supply. This would involve closing the compression vacuum control valve 31 and opening the gas supply valve 15 and the storage control valve 26 at some time during electrical generation. Such variations would be desirable for long-term generation scenarios where the compressed gas supply in the gas storage reservoir would otherwise be depleted.

The power conditioning apparatus of the present invention may be used in a load shaping or load following mode. Under certain conditions, a user may contract with a power supplier for a fixed amount of power to be supplied, e.g., one megawatt (1.0 Mw) for one hour. Such a fixed amount can be obtained at a lower cost than a variable, or load following amount of power due to the more effective and economic utilization of supply system resources. A problem associated with a firm amount of power available at a lower cost is that incremental increases in usage, caused by load demand, can result in incremental increases of power being delivered by the supply system at a much higher cost. For example, a supplemental 0.2 Mw over the initial 1.0 Mw would be obtained at a system incremental cost which is a much higher cost than if the power were obtained under fixed conditions. Additionally, incremental reductions in demand do not result in associated savings. Nevertheless, a firm amount of uninterrupted power may be more desirable, or even a requirement for a given industry. Therefore, the use of the present invention in a load shaping mode can provide meaningful savings to a user.

Since the turbines 12, 19 are maintained in rotation at operational speed, the expansion turbine can be brought online rapidly by the control computer 60. The computer 60 monitors the load demand and if the demand exceeds the of power available, the expansion turbine can be brought on line, driven by ignition of an air/fuel mixture according to one of the methods discussed above, to provide the incremental increase in power necessary to meet the incremental increase in load demand. Further, in the event that the available power exceeds the load requirement, the compression turbine can be brought online, driven by the motor/generator 35, to use the excess power to charge the air reservoir according to the first method outlined above. Computer controlled operation of the power conditioning apparatus 100 in the load shaping mode can result in more efficient power usage and generation by a user.

In general, operation of the power conditioning apparatus of the present invention begins by charging the air reservoir 15 in accordance with either of the charging methods discussed above, as determined by the computer 60 based on prevailing energy costs. Once charged, the computer 60 continues to monitor fuel supply factors from all sources, and the system is brought into the steady state, power conditioning mode, which may include load shaping, as discussed above. The computer 60 continues to monitor system parameters, both mechanical and electrical, with the turbines rotating at operational speed.

If power supplied from the source is disrupted, the flywheel effect of the rotating turbine rotors drives the motor/generator 35 to provide sufficient power for disruptions of several cycles. The inductors provide a buffering effect for supply system faults. Longer periods without supply power can result in the computer 60 isolating the load from the supply system and activating the expansion turbine using air, for short durations and, more typically, an air and fuel mixture to power the expansion turbine in a power generating mode to supplant the absent supply power. In this manner, the present apparatus 100 can act as a power conditioner to provide economical uninterrupted power to a load.

In the load shaping mode, the computer 60 monitors load conditions and the fixed amount of power available from the power source 36. If the load demand exceeds the power available from the source, then the computer 60 can bring the expansion turbine on line in a power generating mode to provide incremental supplemental power. Additionally, if the load demand is exceeded by the available power, then the computer can bring the compression turbine on line using one of the two charging methods previously described to use the excess power available to replenish the stored air supply.

As an ongoing addition to the above, the computer 60 monitors the available energy resources, including transmission sources and can use this information and the present apparatus 100 to store energy to supplement the power source 36 as necessary based on a computer controlled cost analysis.

The present invention provides several advantages to enhance the efficiency of the apparatus and to enhance the efficiency of power generation by user. Since the turbines are maintained at operational speed, this creates a spinning reserve of power, up to the full capacity of the machine. The present invention provides an enhanced soft start capability due to the turbines being synchronized with the system frequency so that the turbines can respond instantaneously to computer induced changes in the operational mode. The apparatus provides better turbine efficiency due to the ability to precisely control the fuel and air mixture. A self-contained combustion turbine is normally run on the order of 150% lean to prevent any afterburner effect due to non-precision air control. With better regulation of air, the turbine of the present invention may be operated under a ratio closer to an ultimate 10:1 by weight mixture. Further, in a conventional turbine, the air temperature varies the efficiency due to the change in density. With the stored air concept, the air temperature is substantially constant, thereby providing constant density and thereby providing more consistent, efficient operation. Additionally, the precise control of air and fuel improves the response time of the turbine, which can enhance the load following capability of the present invention.

Due to the large lean ratio of fuel to air, the combustion temperatures are reduced and thereby efficiency is reduced. Bringing the ratio closer to the ultimate would provide a more efficient turbine. Nevertheless, as the flame temperature increases, the NOX output would increase. The computer may be configured to monitor the NOX and due to the precision control, the mixture can be adjusted to achieve proper balance. While the present invention is described as operating in a mode wherein fuel and compressed air are mixed, the present invention may be operated for short times using compressed air induced power generation only. This would include starting the machine from cold iron conditions and during short term power interruptions.

The present invention provides a high degree of flexibility in terms of the criteria used for the timing of switching from one operating mode to another. Of particular value are variations of the above methods in which the transition from power conditioning mode to electrical generation mode is triggered by the detection of an interruption in the AC power supply. Because the expansion turbine is already rotating at the desired speed, the transition to full power electrical generation is very rapid. The rotational momentum of the spinning rotors of the two turbines is sufficient to power the motor/generator for the short time span between detection of an interruption and full power operation of the expansion turbine. During this time, the inductors buffer the apparatus from supply system faults. Further advantage may be taken of this flywheel effect by incorporating a delay in initiation of expansion turbine operation. Should restoration of AC power be detected before the end of the time delay, connection to the AC power source would be restored without starting the expansion turbine.

The power conditioning apparatus of the present invention provides for direct conversion of energy derived from natural gas, oil or other fossil fuels to electricity and provides for the storage of electrical and fuel energy in the form of compressed air or other gas which can then be used to supplement the production of electricity at a later time. The electricity may be consumed in-house or provided to a grid on a merchant basis. The apparatus may be sized according to the load, and thus may be used to provide a small machine for a single-family dwelling or a large machine for a merchant plant. The apparatus builds upon the necessity of power conditioning to provide, with a single-shafted machine, uninterruptable AC power, the availability of spinning reserve, backup, load following, self-generation, fuel selectivity, energy storage and tolling capability. Ultimately, the apparatus will provide the ability to purchase capacity, energy and transportation components at the most economical prices and then supplement those components to assemble an economically optimized package.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A power conditioning apparatus with energy conversion and storage capabilities for use to supplement power supplied to a load from a commercial power source, to operate using electrical power from an electrical power source, to operate using fossil fuel from a fuel power source, to provide an auxiliary power source, power conditioning and load shaping, said apparatus comprising:

a rotary power shaft;

a compression turbine connected to said rotary power shaft for being driven by said rotary power shaft, said compression turbine including a compression turbine housing defining a compression turbine cavity;

an expansion turbine connected to said rotary power shaft for driving said rotary power shaft, said expansion turbine including an expansion turbine housing defining an expansion turbine cavity;

a motor/generator connected to said rotary power shaft for selectively driving and being driven by said rotary power shaft, said motor/generator and said expansion turbine being selectively operable individually and in combination to maintain rotation of said expansion turbine and said compression turbine at a nominal operational speed;

a gas storage reservoir selectively connectable to said compression turbine and said expansion turbine;

an electrical circuit for providing electrical communication between said motor/generator, the power source and the load; and means for controlling the operation of said apparatus including means for monitoring electrical and mechanical conditions within said power conditioner, means for monitoring the power supply and means for controlling electrical and mechanical control devices associated with said power conditioning apparatus, said means for controlling electrical and mechanical control devices including means for selecting operation of said motor/generator and said expansion turbine to maintain rotation of said expansion turbine and said compression turbine at a nominal operational speed.

2. A power conditioning apparatus according to claim 1 wherein said means for controlling the operation of said system includes a preprogrammed computer, said electrical control devices include a plurality of switches disposed within said electrical circuit in communication with said computer, said mechanical control devices include a plurality of remotely actuable valves operatively connected to said compression turbine, said expansion turbine and said computer.

3. A power conditioning apparatus according to claim 2 wherein said computer includes a modem for communication with remote sources of energy and said computer is configured to determine the cost of energy available to the apparatus and to select one or more energy sources based on an internally calculated cost analysis.

4. A power conditioning apparatus according to claim 2 wherein said computer is configured to monitor the presence and absence of power available from the power source and to activate said expansion turbine to drive said motor/generator responsive to the absence of power from the power source.

5. A power conditioning apparatus according to claim 2 wherein said computer is configured to operate said apparatus for load shaping by monitoring said power source for a predetermined fixed power value and activating said expansion turbine to drive said motor/generator responsive to said computer determining that said power value is below said fixed power value and activating said compression turbine to charge said gas reservoir responsive to said computer determining that said power value is greater that said fixed power value.

6. A power conditioning apparatus according to claim 2 further comprising a vacuum apparatus operatively connected to said computer, said compression turbine and said expansion turbine for selective evacuation of said compression cavity, said expansion cavity or both to assist in maintaining rotation of said compression turbine and said expansion turbine at a nominal operational speed.

7. A power conditioning apparatus with energy conversion and storage for converting and storing electrical energy, fossil fuel energy, or both in the form of a compressed gas, the gas being obtained from a gas supply and compressed using said apparatus, for selective release and use in the production of electrical power, said apparatus comprising:

a motor/generator having an electrical supply connection for selectively receiving, supply power from an AC power source, and an electrical load connection for selectively providing conditioned AC power to a load;

a first rotary power shaft operatively attached to said motor/generator;

means for power shaft coupling attached to said first rotary power shaft;

a second rotary power shaft coupled to said first rotary power shaft using said means for power shaft coupling;

a compression turbine including a compression turbine housing defining a compression cavity and having a compression rotor disposed within said compression cavity, said compression rotor being operatively attached to said second rotary power shaft for rotation therewith, said compression turbine housing further defining an intake port in fluid communication with said compression cavity and selectively in fluid communication with a supply of gas;

an expansion turbine including an expansion turbine housing defining an expansion cavity and having an expansion rotor disposed within said expansion cavity, said expansion rotor being operatively attached to said second rotary power shaft for rotation therewith, said expansion turbine housing further defining a fuel supply port and an exhaust port in fluid communication with said expansion cavity, said fuel supply port being, in fluid communication with a regulated fossil fuel supply, said expansion turbine and said motor/generator being selectively operable individually and in combination to maintain rotation of said expansion turbine and said compression turbine at a nominal operational speed;

a vacuum apparatus operatively connected to both said compression cavity and said expansion cavity for selective evacuation of said compression cavity said expansion cavity or both to assist in maintaining rotation of said compression turbine, and said expansion turbine at a nominal operational speed;

a gas storage reservoir in fluid communication with said compression turbine for receipt and pressurized storage of gas compressed by said compression turbine, said reservoir being in fluid communication with said expansion turbine for selective flow of said compressed gas from said gas storage reservoir into said expansion turbine to drive said expansion turbine;

means for controlling gas flow between said compression turbine and said gas storage reservoir;

means for controlling, as flow between said gas storage reservoir and said expansion turbine;

means for electrically isolating the AC power source from said electrical supply connection; and a control system for controlling the operation of said power conditioning apparatus including means for monitoring electrical and mechanical conditions within said power conditioning apparatus, means for monitoring the power supply and means for controlling electrical and mechanical control devices associated with said power conditioning apparatus, said means for controlling electrical and mechanical control devices including, means for selecting operation of said motor/generator and said expansion turbine to maintain rotation of said expansion turbine and said compression turbine at a nominal operational speed.

8. A power conditioning apparatus with energy conversion and storage according to claim 7 wherein said gas supply is an air supply, and said gas storage reservoir is an air storage reservoir.

9. A power conditioning apparatus with energy conversion and storage according to claim 7 wherein said control system includes a preprogrammed computer and said means for controlling gas flow between said compression turbine and said gas storage reservoir and said means for controlling gas flow between said gas storage reservoir and said expansion turbine include remotely actuable valves selectively operable by said computer.

10. A power conditioning apparatus with energy conversion and storage according to claim 9 and further comprising a plurality of electrical switches for controlling electricity flow within said power conditioning apparatus, said switches being remotely selectively actuable responsive to said computer.

11. A power conditioning apparatus with energy conversion and storage according to claim 10 and further comprising means associated with said computer for communication between said computer and an entity remotely disposed from said power conditioning apparatus.

12. A power conditioning apparatus with energy conversion and storage according to claim 11 wherein said remotely disposed entity is a commercial electrical power source.

13. A power conditioning apparatus with energy conversion and storage according to claim 11 wherein said remotely disposed entity is a commercial fossil fuel power source.

14. A power conditioning apparatus with energy conversion and storage according to claim 7 and further comprising means for voltage spike protection electrically operable between the AC power source and said electrical supply connection.

15. A power conditioning apparatus with energy conversion and storage according to claim 14 wherein said means for voltage spike protection comprises a predetermined arrangement of inductors and metal oxide varistors.

16. A power conditioning apparatus with energy conversion and storage according to claim 7 further comprising means for harmonic filtering connected to said electrical load connection of said motor/generator.

17. A power conditioning apparatus with energy conversion and storage according to claim 16 wherein said means for harmonic filtering comprises a grounded wye capacitor bank.

18. A power conditioning apparatus with energy conversion and storage according to claim 7 further comprising means of recovering heat connected to said compression turbine housing and said expansion turbine housing.

19. A power conditioning apparatus with energy conversion and storage according to claim 7 further comprising a heat exchanger connected to said means for controlling gas flow between said gas storage reservoir and said expansion turbine, said heat exchanger assisting in the prevention of ice formation.

20. A power conditioning apparatus with energy conversion and storage according to claim 7 further comprising means for operably connecting said vacuum apparatus to said second rotary power shaft, thereby powering said vacuum apparatus.

21. A power conditioning apparatus with energy conversion and storage according to claim 7 wherein said control system includes means for detecting interruption and restoration of electrical power from the AC power source.

22. A method of storing electrical energy in the form of a compressed gas for selective release and use in the production of electrical power, said method comprising the following steps:

providing a power conditioning apparatus including a rotary power shaft;

an expansion turbine including an expansion turbine housing defining an expansion cavity, an exhaust port in fluid communication with said expansion cavity, and a fuel supply port selectively in fluid communication with a regulated fuel supply, said expansion turbine also including an expansion turbine rotor disposed within said expansion cavity, said expansion turbine rotor being operatively attached to said rotary power shaft;

a compression turbine including a compression turbine housing, defining a compression cavity and an intake port in fluid communication with said compression cavity and selectively in fluid communication with a gas supply, said compression turbine also including a compression turbine rotor disposed within said compression cavity, said compression turbine rotor being operatively attached to said rotary power shaft, a gas storage reservoir selectively in fluid communication with said compression cavity and said expansion cavity;

a motor/generator operatively connected to said rotary power shaft and selectively connectable to an AC power source and to an electrical load, said motor/generator and said expansion turbine being selectively operable individually and in combination to maintain rotation of said expansion turbine and said compression turbine at a nominal operational speed;

a vacuum apparatus operatively connected to said expansion cavity and to said compression cavity for selective evacuation of said expansion cavity said compression cavity or both to assist in maintaining rotation of said compression turbine and said expansion turbine at a nominal operational speed;

a control system for controlling the operation of said power conditioning apparatus including means for monitoring electrical and mechanical conditions within said power conditioning apparatus, means for monitoring the AC power source and the electrical load and means for controlling electrical and mechanical control devices associated with said power conditioning apparatus, said means for controlling electrical and mechanical control devices including means for selecting operation of said motor/generator and said expansion turbine to maintain rotation of said expansion turbine and said compression turbine at a nominal operational speed;

connecting said motor/generator to the AC power source, thereby powering said motor/generator, thereby rotating said rotary power shaft, thereby rotating said expansion turbine rotor and said compression turbine rotor;

evacuating said expansion cavity using said vacuum apparatus to assist in maintaining, rotation of said expansion turbine and said compression turbine to provide enhanced responsiveness to a change in operating mode;

pressurizing said gas storage reservoir by compressing gas from the gas supply using said compression turbine and directing the compressed gas from said compression turbine into said gas storage reservoir;

terminating pressurization of said gas storage reservoir by obstructing the flow of gas from the gas supply to said compression turbine and obstructing the flow of compressed gas from said compression turbine into said gas storage reservoir;

evacuating said compression cavity using said vacuum apparatus to assist in maintaining rotation of the compression rotor;

isolating said motor/generator from the AC power source and substantially simultaneously initiating electrical power generation by directing compressed gas to flow from said gas storage reservoir into said expansion turbine, and directing fuel to flow from the regulated fuel supply into said expansion turbine and igniting said fuel along with said compressed gas thereby powering said expansion turbine, thereby maintaining rotation of said rotary power shaft, thereby powering said motor/generator, thereby supplying electricity to said electrical load; and terminating electrical power veneration by obstructing flow of compressed gas from said gas storage reservoir into said expansion turbine, obstructing fuel flow from said regulated fuel supply into said expansion turbine and substantially simultaneously restoring connection of said motor/generator to the AC power source to maintain rotation of said expansion turbine and said compression turbine.

23. A method according to claim 22 wherein said method is used to provide uninterruptable AC power and further comprises the following steps:

detecting interruption of power from the AC power source after pressurization of gas storage reservoir and evacuation of compression cavity, said interruption being immediately followed by the step wherein the motor/generator is isolated from the AC power source and electrical power generation is initiated; and detecting restoration of power from the AC power source, said restoration being immediately followed by the step wherein electrical power generation is terminated.

24. A method according to claim 22 and further comprising the following steps:

during electrical power generation, further pressurizing said gas storage reservoir by compressing gas from the gas supply using said compression turbine and directing the compressed gas into said air storage reservoir; and following termination of electrical power generation, evacuating said compression cavity using said vacuum apparatus to assist in maintaining rotation of the compression turbine and the expansion turbine.

25. A method according to claim 22 wherein said control system includes a preprogrammed computer, a plurality of remotely actuable, computer controlled valves and a plurality of remotely actuable, computer controlled switches, said valves being disposed within said system to obstruct gas, fuel and exhaust flow, and said switches being disposed within said system to control and direct current.

26. A method according to claim 25 and further comprising the steps of providing a communication system associated with said computer for communication between said computer and a remote source of energy, and establishing communication with the remote source of energy, monitoring energy rates using said computer, determining the most economical configuration for said apparatus using said computer and the energy rates obtained thereby, and configuring said apparatus to operate in a mode that will provide the most economical energy usage as determined by said computer.

27. A method according to claim 26 and further comprising the steps of maintaining rotation of said expansion turbine and said compression turbine at a nominal operational speed, and bringing said expansion turbine online using said computer controlled valves when said computer determines that it is cost effective to bring said expansion turbine online.

28. A method according to claim 26 and further comprising the steps of maintaining rotation of said expansion turbine and said compression turbine at a nominal operational speed, and bringing said compression turbine online using said computer controlled valves when said computer determines that it is cost effective to bring said compression turbine online.

29. A method of storing electrical and fossil fuel energy in the form of compressed air for selective release and use in the production of electrical power, said method comprising the following steps:

providing a power conditioning apparatus including a rotary power shaft;

an expansion turbine including an expansion turbine housing defining an expansion cavity, an exhaust port in fluid communication with said expansion cavity and a fuel supply port selectively in fluid communication with a regulated fuel supply, said expansion turbine also including an expansion turbine rotor disposed within said expansion cavity, said expansion turbine rotor being operatively attached to said rotary power shaft;

a compression turbine including a compression turbine housing defining a compression cavity and an intake port in fluid communication with said compression cavity and selectively in fluid communication with an air supply, said compression turbine also including a compression turbine rotor disposed within said compression cavity, said compression turbine rotor being operatively attached to said rotary power shaft;

an air storage reservoir selectively in fluid communication with said compression cavity and said expansion cavity;

a motor/generator operatively connected to said rotary power shaft and selectively connectable to an AC power source and to an electrical load, said motor/generator and said expansion turbine being selectively operable individually and in combination to maintain rotation of said expansion turbine and said compression turbine at a nominal operational speed;

a vacuum apparatus operatively connected to said expansion cavity and to said compression cavity for selective evacuation of said expansion cavity, said compression cavity or both to assist in maintaining rotation of said compression turbine and said expansion turbine at a nominal operational speed;

a control system for controlling the operation of said power conditioning apparatus including means for monitoring electrical and mechanical conditions within said power conditioning apparatus, means for monitoring the AC power source and the electrical load and means for controlling electrical and mechanical control devices associated with said power conditioning apparatus, said means for controlling electrical and mechanical control devices including means for selecting operation of said motor/generator and said expansion turbine to maintain rotation of said expansion turbine and said compression turbine at a nominal operational speed;

connecting said motor/generator to the AC power source, thereby powering said motor/generator, thereby rotating said rotary power shaft, thereby rotating said expansion turbine rotor and said compression turbine rotor;

evacuating said expansion cavity using said vacuum apparatus to assist in maintaining rotation of said expansion turbine rotor;

pressurizing said air storage reservoir by compressing air from the air supply using said compression turbine and directing the compressed air into said air storage reservoir until pressure in said air storage reservoir reaches operating pressure of said expansion turbine;

isolating said motor/generator from the AC power source and substantially simultaneously initiating further pressurization of said air storage reservoir and initiating generation of electrical power by directing compressed air to flow from said air storage reservoir into said expansion turbine and substantially simultaneously directing fuel to flow from the regulated fuel supply into said expansion turbine and igniting said fuel along with said compressed air, thereby powering said expansion turbine, thereby maintaining rotation of said rotary power shaft, thereby powering said compression turbine, thereby compressing air from said air supply and directing the compressed air into said air storage reservoir, said rotation of said rotary power shaft further powering said motor/generator, thereby supplying electricity to said electrical load;

terminating air storage reservoir pressurization and electrical power generation by obstructing flow of compressed air from said air storage reservoir into said expansion turbine and obstructing flow of fuel from said regulated fuel supply into said expansion turbine;

reconnecting said motor/generator to the AC power source, thereby powering said motor/generator, thereby maintaining rotation of said rotary power shaft;

evacuating said compressor cavity and said expansion cavity using said vacuum apparatus to assist in maintaing rotation of said expansion turbine rotor and said compression turbine rotor;

isolating said motor/generator from the AC power source and substantially simultaneously initiating electrical power generation by directing compressed air and fossil fuel to flow from said expansion turbine, igniting said compressed air and fossil fuel, thereby powering said expansion turbine, thereby maintaining rotation of said rotary power shaft, thereby powering said motor/generator, thereby supplying electricity to said electrical load; and terminating electrical power generation by obstructing flow of compressed air and fossil fuel into said expansion turbine and substantially simultaneously restoring connection of said motor/generator to the AC power source.

30. A method according to claim 29 wherein said control system includes a preprogrammed computer, a plurality of remotely actuable, computer controlled valves and a plurality of remotely actuable, computer controlled switches, said valves being disposed within said system to obstruct gas and exhaust flow, and said switches being disposed within said system to control and direct current.

31. A method according to claim 30 and further comprising the steps of providing a communication system associated with said computer for communication between said computer and a remote source of energy, and establishing communication with the remote source of energy, monitoring energy rates using said computer, determining the most economical configuration for said apparatus using said computer and the energy rates obtained thereby, and configuring said apparatus to operate in a mode that will provide the most economical energy usage as determined by said computer.

32. A method according to claim 29 and further comprising the steps of maintaining rotation of said expansion turbine and said compression turbine at a nominal operational speed, and bringing said expansion turbine online using said computer controlled valves when said computer determines that it is cost effective to bring said expansion turbine online.

33. A method according to claim 29 and further comprising the steps of maintaining rotation of said expansion turbine and said compression turbine at a nominal operational speed, and bringing said compression turbine online using said computer controlled valves when said computer determines that it is cost effective to bring said compression turbine online.

34. A method according to claim 33 wherein said method is used to provide uninterruptable AC power and further comprises the following steps:

detecting interruption of power from the AC power source using said control system after pressurization of gas storage reservoir and evacuation of compression cavity, said interruption being immediately followed by the step wherein the motor/generator is isolated from the AC power source and electrical power generation is initiated; and detecting restoration of power from the AC power source using said control system, said restoration being immediately followed by the step wherein electrical power generation is terminated.

35. A method for load shaping using a power conditioning apparatus with energy conversion and storage capabilities, said method comprising the steps of:

providing a rotary power shaft; a compression turbine connected to said rotary power shaft for being driven by said rotary power shaft; an expansion turbine connected to said rotary power shaft for driving said rotary power shaft; a motor/generator connected to said rotary power shaft for selectively driving and being driven by said rotary power shaft, said motor/generator and said expansion turbine being selectively operable individually and in combination to maintain rotation of said expansion turbine and said compression turbine at a nominal operational speed; a gas storage reservoir selectively connectable to said compression turbine and said expansion turbine; a vacuum apparatus operatively connected to both said compression cavity and said expansion cavity for selective evacuation of said compression cavity said, expansion cavity or both to assist in maintaining rotation of said compression turbine and said expansion turbine at a nominal operational speed; an electrical circuit for providing electrical communication between said motor/generator, the power source and the load; and means for controlling the operation of said apparatus including means for monitoring electrical and mechanical conditions within said power conditioner; means for monitoring the power source and means for controlling electrical and mechanical control devices associated with said power conditioning apparatus, said means for controlling electrical and mechanical control devices including means for selecting operation of said motor/generator and said expansion turbine to maintain rotation of said expansion turbine and said compression turbine at a nominal operational speed;

monitoring the power available from said power source based on a predetermined threshold power value using said means for monitoring the power source;

activating said expansion turbine in a configuration to provide supplemental power, based on a determination by said means for monitoring said power source that the power available from said power source is less than said threshold value; and activating said compression turbine in a configuration to charge said, as reservoir, based on a determination by said means for monitoring said power source that the power available from said power source is greater than said threshold value.

36. A method for power conditioning using a power conditioning apparatus with energy conversion and storage capabilities, said method comprising, the steps of:

providing a rotary power shaft; a compression turbine connected to said rotary power shaft for being, driven by said rotary power shaft; an expansion turbine connected to said rotary power shaft for driving said rotary power shaft; a motor/generator connected to said rotary power shaft for selectively driving and being driven by said rotary power shaft, said motor/generator and said expansion turbine being selectively operable individually and in combination to maintain rotation of said expansion turbine and said compression turbine at a nominal operational speed; a gas storage reservoir selectively connectable to said compression turbine and said expansion turbine; a vacuum apparatus operatively connected to both said compression cavity and said expansion cavity for selective evacuation of said compression cavity, said expansion cavity or both to assist in maintaining rotation of said compression turbine and said expansion turbine at a nominal operational speed; an electrical circuit for providing electrical communication between said motor/generator, the power source and the load; and means for controlling the operation of said apparatus including means for monitoring electrical and mechanical conditions within said power conditioner; means for monitoring the power source and means for controlling electrical and mechanical control devices associated with said power conditioning apparatus, said means for controlling electrical and mechanical control devices including means for selecting operation of said motor/generator and said expansion turbine to maintain rotation of said expansion turbine and said compression turbine at a nominal operational speed;

maintaining rotation of said compression turbine and said expansion turbine at a nominal operational speed;

monitoring the power available from said power source using said means for monitoring the power source; and providing power to the load using said expansion turbine in the event that said means for monitoring the power source determines that power is not present from said power source.

\* \* \* \* \*